(12) United States Patent
Ming et al.

(10) Patent No.: US 8,363,150 B2
(45) Date of Patent: Jan. 29, 2013

(54) LENS CONTROL APPARATUS

(75) Inventors: Fan Kin Ming, Hong Kong (CN); Lam Sio Kuan, Hong Kong (CN); Cheng Kwok Sing, Hong Kong (CN); Yang Hua, Shenzhen (CN); Fan Wing Ming, Hong Kong (CN)

(73) Assignee: Hong Kong Applied Science and Technology Research Institute Co. Ltd., Hong Kong (CN)

( * ) Notice: Subject to any disclaimer, the term of this patent is extended or adjusted under 35 U.S.C. 154(b) by 204 days.

(21) Appl. No.: 12/639,156

(22) Filed: Dec. 16, 2009

(65) Prior Publication Data

US 2011/0141342 A1 Jun. 16, 2011

(51) Int. Cl.
*H04N 5/225* (2006.01)
(52) U.S. Cl. ............... 348/340; 348/208.11; 348/345
(58) Field of Classification Search ............ 348/208.7, 348/208.11, 208.99, 340, 345, 347, 350, 348/351, 357, 335; 359/822–824; 396/133
See application file for complete search history.

(56) References Cited

U.S. PATENT DOCUMENTS

| 7,400,463 | B1 * | 7/2008 | Wu ............................ 359/824 |
| 7,609,465 | B2 * | 10/2009 | Wu ............................ 359/819 |
| 7,974,528 | B2 * | 7/2011 | Chou ......................... 396/55 |
| 2007/0110424 | A1 * | 5/2007 | Iijima et al. .............. 396/133 |
| 2007/0242152 | A1 * | 10/2007 | Chen ......................... 348/345 |
| 2008/0297642 | A1 * | 12/2008 | Osaka ........................ 348/335 |
| 2011/0052164 | A1 * | 3/2011 | Huang et al. ............. 396/55 |

* cited by examiner

*Primary Examiner* — Aung S Moe
*Assistant Examiner* — Chriss Yoder, III
(74) *Attorney, Agent, or Firm* — Brooks Kushman P.C.

(57) ABSTRACT

An autofocus and motion control apparatus is provided. According to one embodiment, the autofocus and motion control apparatus comprises a lens control apparatus having an imaging lens unit and a lens holder and a plurality of actuators configured to move the lens holder in predetermined directions within the lens control apparatus. Embodiments of the lens control apparatus include a casing; an imaging lens unit and lens holder movable within the casing along an optical axis, the imaging lens unit and lens holder further pivotable within the casing, an autofocus actuator is configured to move the imaging lens unit and lens holder within the casing along the optical axis; a first lateral actuator is configured to provide a force to pivot the lens holder in a first direction; and a second lateral actuator is configured to provide a force to pivot the lens holder in a second direction.

18 Claims, 10 Drawing Sheets

LENS CONTROL APPARATUS

FIELD OF THE INVENTION

The present invention relates to a lens control apparatus, and more particularly, to a lens control apparatus for autofocus and motion correction functions in optical imaging modules.

BACKGROUND OF THE INVENTION

Conventional cameras may include a number of electronically controlled devices to assist in capturing images. For example, an auto-focusing device can be used to bring an image that the user desires to capture into focus. This can be accomplished by the displacement of the lens along the optical axis to control the distance between the lens and the image capturing mechanism. Another electronically controlled device is vibration compensation device, which compensates for vibration of the camera body, for example, due to inadvertent shaking of the camera caused by hand shaking. This technique typically requires one of the multiple lenses in a lens module, to be moved relative to the image capturing device to reduce the image blurring effect caused by the motion of the camera.

Currently, camera modules are used in cellular phones. Existing vibration compensation devices are not suitable for cellular phones as they typically require a large space which is not available in a cellular phone. Accordingly, there is a need for a lens control apparatus that overcomes these and other shortcomings of existing devices.

SUMMARY OF THE INVENTION

According to one embodiment of the present invention, a lens control apparatus for providing autofocus and motion control is disclosed. The lens control apparatus includes a casing; a lens holder holding an imaging lens unit, the lens holder movable within the casing along an optical axis, the lens holder further pivotable within the casing, the lens holder further movable along the optical axis; an autofocus actuator disposed within the casing, wherein the autofocus actuator is configured to move the lens holder within the casing along the optical axis; a first lateral actuator disposed within the casing, wherein the first lateral actuator is configured to provide a force to pivot the lens holder in a first direction; and a second lateral actuator disposed within the casing, wherein the second lateral actuator is configured to provide a force to pivot the lens holder in a second direction, wherein at least a part of the autofocus actuator is coupled to the lens holder, and at least a part of the first lateral actuator and at least a part of the second lateral actuator are each coupled to the lens holder.

According to another embodiment of the present invention, a lens control apparatus for providing autofocus and motion control in response to control signals sent to the lens control apparatus by a controller is disclosed. The lens control apparatus includes a casing; a lens holder movable within the casing along an optical axis, the lens holder further pivotable within the casing; an autofocus control mechanism, wherein the autofocus control mechanism is configured to receive focus signals from the controller, the autofocus mechanism further configured to move the lens holder relative to the casing along the optical axis in response to the received focus signals; and a motion control mechanism, wherein the motion control mechanism is configured to receive motion control signals from the controller, the motion control mechanism further configured to pivot the lens holder in response to the motion control signals.

According to another embodiment of the present invention, a lens control apparatus for providing autofocus and motion control is disclosed. The lens control apparatus includes a casing; an imaging lens unit movable within the casing along an optical axis, the imaging lens unit further pivotable within the casing; an autofocus actuator disposed within the casing, wherein the autofocus actuator is configured to move the imaging lens unit within the casing along the optical axis; a first lateral actuator disposed within the casing, wherein the first lateral actuator is configured provide a force to make the imaging lens unit pivot in a first direction; and a second lateral actuator disposed within the casing, wherein the second lateral actuator is configured to provide a force to make the imaging lens unit pivot in a second direction, and wherein at least a part of the autofocus actuator is coupled to the imaging lens unit, and at least a part of the first and second lateral actuators are coupled to the imaging lens unit.

DETAILED DESCRIPTION

In the following description, reference is made to the accompanying drawings where, by way of illustration, specific embodiments of the invention are shown. It is to be understood that other embodiments may be used as structural and other changes may be made without departing from the scope of the present invention. Also, the various embodiments and aspects from each of the various embodiments may be used in any suitable combinations. Accordingly, the drawings and detailed description are to be regarded as illustrative in nature and not as restrictive. Like elements in each of the figures are referred to by like reference numbering.

Generally, embodiments of the present invention are directed to a lens control apparatus having autofocus and motion control. According to one embodiment, the lens control apparatus comprises a lens holder, which is used to carry an imaging lens unit, and a plurality of actuators configured to move the lens holder in predetermined directions within the lens control apparatus. The motion of the lens holder is in response to autofocus control signals and motion control signals. For example, when used as part of a camera, the lens holder can be moved toward or away from the subject of the photograph to adjust the focus. Also, the lens holder can be moved, or pivoted, to compensate for any shaking or other motion that occurs during use. For example, considering an optical axis of the lens holder is directed toward the subject of the photograph, the lens holder can pivot horizontally and vertically to address motion in two different dimensions.

Figure 1:
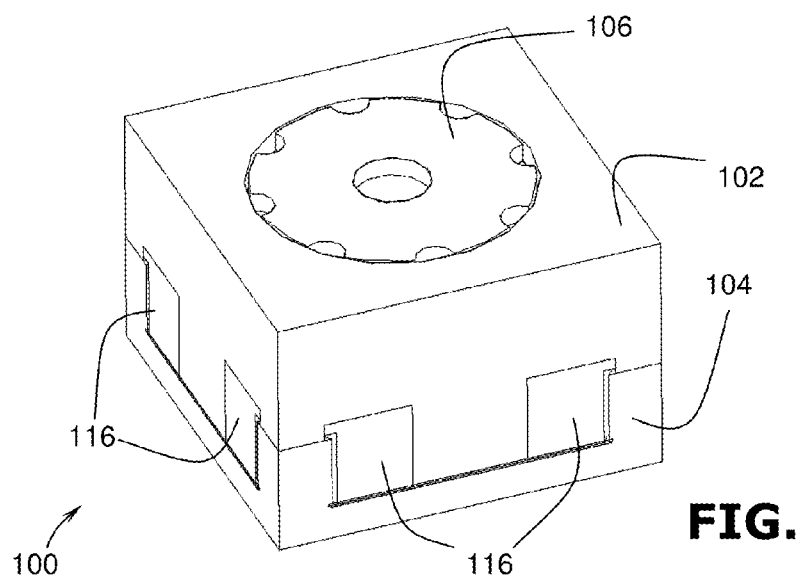
FIG. 1 is a perspective view of a lens control apparatus, in accordance with an embodiment of the present invention.
Figure 2:
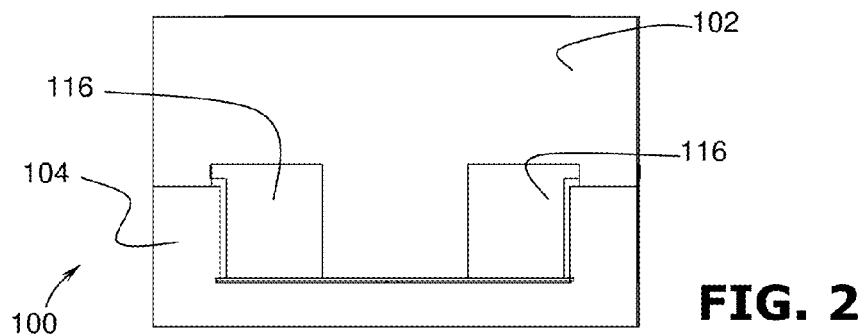
FIG. 2 is a side view of the lens control apparatus shown in FIG. 1, in accordance with an embodiment of the present invention.
Figure 3:
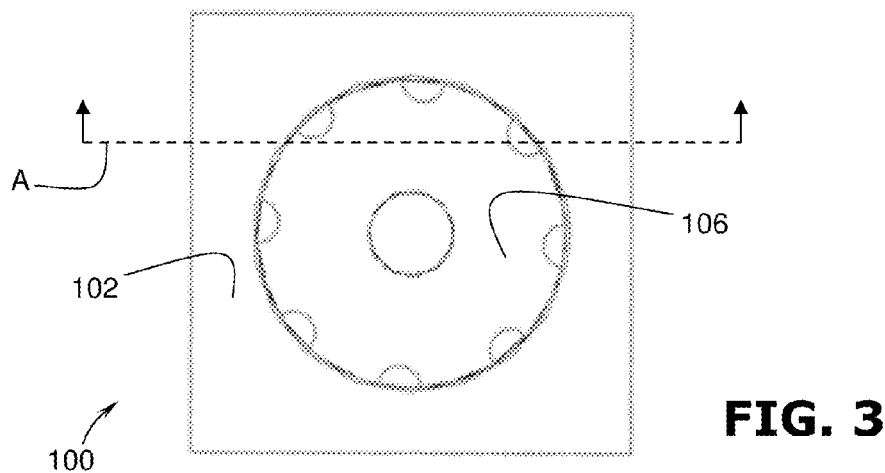
FIG. 3 is a top view of the lens control apparatus shown in FIG. 1, in accordance with an embodiment of the present invention.

Referring to FIGS. 1 to 3, a lens control apparatus 100 is shown. FIG. 1 is a perspective view of the lens control apparatus 100, FIG. 2 is a side view of the lens control apparatus 100 shown in FIG. 1, and FIG. 3 is a top view of the lens control apparatus 100 shown in FIG. 1. The lens control apparatus 100 includes an upper casing 102, a lower casing 104, an imaging lens unit 106, and supports 116. The upper casing 102 and the lower casing 104 are coupled together forming a casing of the lens control apparatus 100. According to one embodiment, the working components of the lens control apparatus 100 are disposed substantially within the casing.

Figure 4:
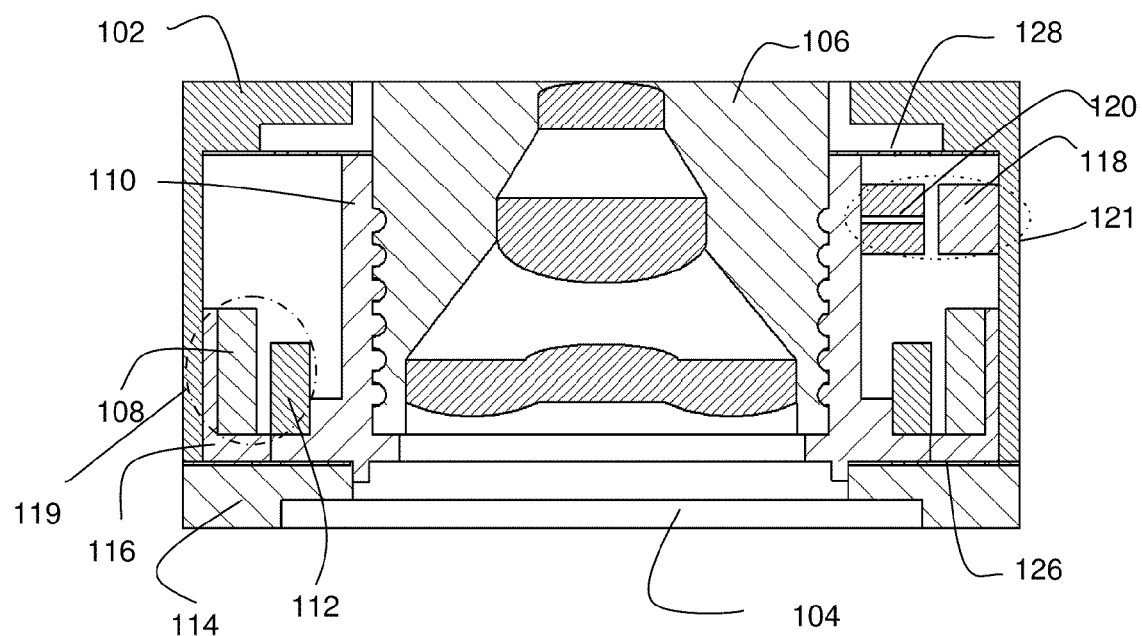
FIG. 4 is a side cross sectional view of the lens control apparatus shown in FIG. 1, in accordance with an embodiment of the present invention.

FIG. 4 is a side cross sectional view of the lens control apparatus shown in FIG. 1, in accordance with an embodiment of the present invention. The cross sectional view is taken at line A, shown in FIG. 3. In the cross sectional view, the arrangement and operation of the elements of the lens control apparatus can be shown and described, including those elements shown in FIGS. 1 to 3. The upper casing 102, the lower casing 104, the imaging lens unit 106, and the autofocus actuator magnet elements 108 are shown. The imaging lens unit 106 is engaged with a lens holder 110. In one embodiment, the outer surface of the imaging lens unit 106 has threads and the lens holder 110 has threads corresponding to the threads of the imaging lens unit 106, and the imaging lens unit 106 is coupled to the lens holder 110 by threaded engagement. A coil 112 is attached to the lens holder 110, wherein motion to the coil 112 produces corresponding motion in the lens holder 110. A plurality of corners posts 114, one in each corner of the lower casing 102, each engage a corresponding support 116. Each of the supports 116 is positioned generally the corner positions of the lens control apparatus 100. A set of four autofocus actuator magnet elements 108 is disposed within the casing, one in each of the corners of the lower casing 104. Each of the supports 116 engages a corresponding autofocus actuator magnet element 108. Each of the autofocus actuator magnet elements 108 is positioned to interact with the coil 112. The coil 112 together with the autofocus actuator magnet elements 108 comprises an autofocus actuator 119. An autofocus mechanism is, thereby provided to control the autofocus motion of the imaging lens unit 106.

Figure 5:
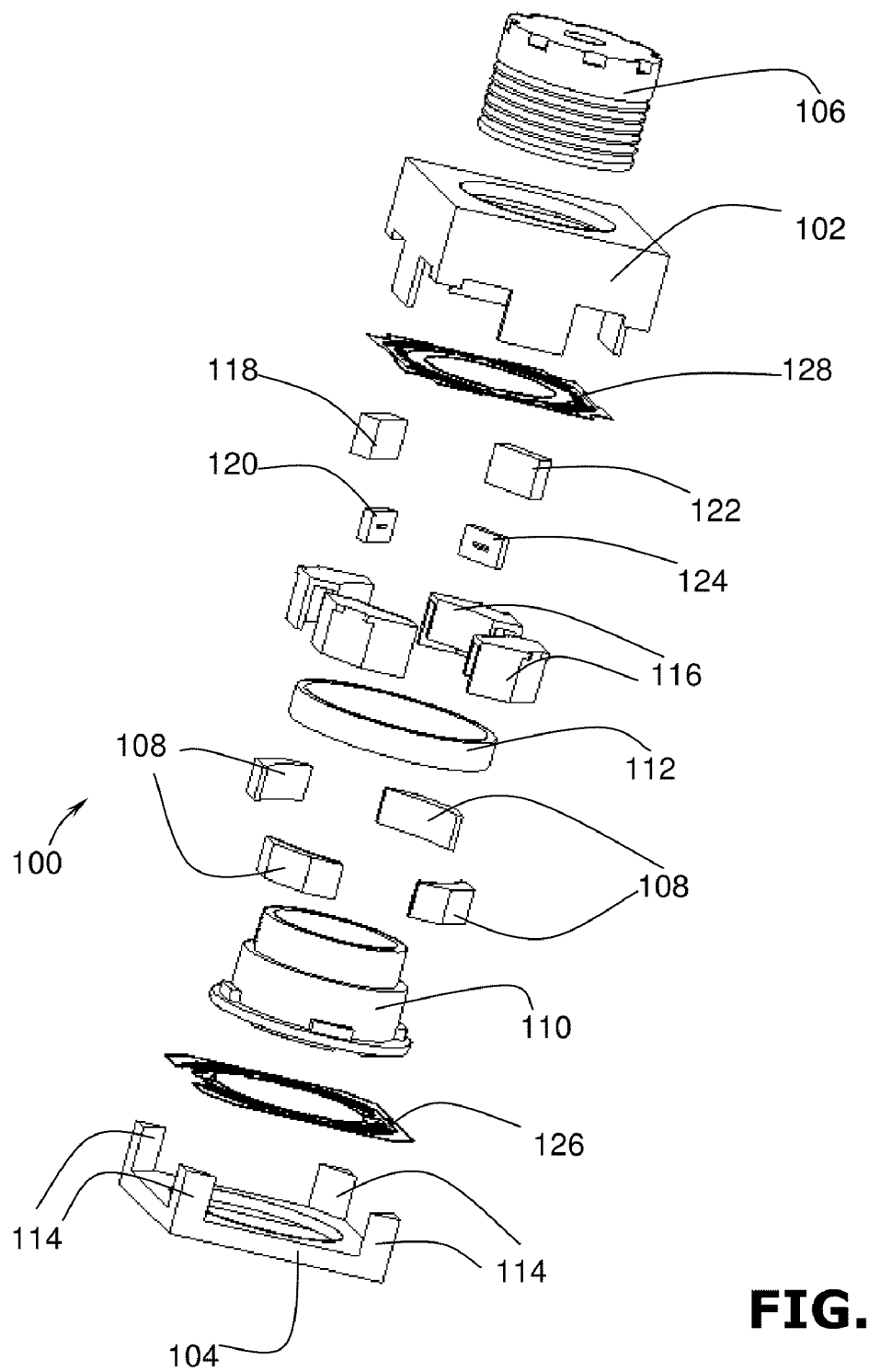
FIG. 5 is an exploded view of the lens control apparatus shown in FIG. 1, in accordance with an embodiment of the present invention.

A set of actuator magnet elements is positioned to interact with a first coil 120 and a second coil 124 (shown in FIG. 5). A first magnet element 118 of the actuator magnet elements is positioned proximate to a first coil 120. The first magnet element 118 and the first coil 120 together comprise a first actuator 121. A second magnet element 122 (shown in FIG. 5) of the set of actuator magnet elements and the second coil 124 (shown in FIG. 5) together comprise a second actuator 125. A motion control mechanism is thereby provided to control a pivoting motion of the imaging lens unit 106 in two dimensions.

In one embodiment, each of the first actuator 121 and the second actuator 125 are configured to generate lateral motion. However, due to the presence of the lower spring 126 and upper spring 128, a pivot point is effectively created along the optical axis between a lower spring 126 and an upper spring 128. However, depending on the implementation, the pivot point may be created at a different position in the lens control apparatus. The pivot point should be generally understood as a frame of reference for the purpose of describing the motion of the lens holder 110 and not a physical component or location on which another component pivots. The position of the lens holder 110 will be changed accordingly during the longitudinal motion (auto-focusing motion), such that the lateral motion of the first lateral actuator 121 and the second lateral actuator 125 generates a pivoting motion of the lens holder 110 about the pivot point. The tilting motion is generated by the first lateral actuator 121 and the second lateral actuator 125 applying forces on the lens holder 110, either together or independently, causing the lens holder 110 to pivot about the pivot point. In another embodiment, the first lateral actuator 121 and the second lateral actuator 125 may be in a different position relative to the upper and lower springs to increase the length of the moment arm from the pivot point, which can reduce the amount force needed to generate for tilting motion and prevent undesired lateral movement.

The lower spring 126 is positioned in the lower casing 104 and the upper spring 128 is positioned in the upper casing 102. The lower spring 126 is disposed between the lower casing 104 and the lens holder 110 and the upper spring 128 is disposed between the upper casing 102 and the lens holder 110. The lower spring 126 and the upper spring 128 assist with controlling the movement of the lens holder 110 within the casing. For example, each of the lower spring 126 and the upper spring 128 may be a coil spring, having a diameter larger than the diameter of the lens holder 110. The lower spring 126 and the upper spring 128 may also each be a leaf spring, or one or more leaf springs arranged proximate to the respective ends of the lens holder 110. The upper and lower springs may also be positioned in different locations. For example, both may be located proximate to each other at one end of the lens holder 110.

FIG. 5 is an exploded view of the lens control apparatus shown in FIG. 1, in accordance with an embodiment of the present invention. The lens control apparatus 100 includes the upper casing 102 and the lower casing 104 encasing the remaining components of the lens control apparatus. The imaging lens unit 106 is disposed within the casing, both the upper casing 102 and the lower casing 104 having openings defined in the upper and lower casings 102, 104 to allow either movement through the openings or to allow image capture using the imaging lens unit 106. Also shown in FIG. 5 are the upper spring 128, the lower spring 126, the lens holder 110, the autofocus actuator comprising the coil 112 and the autofocus actuator magnet elements 108, the first lateral actuator comprising the first magnet element 118 and the first coil 120, and the second lateral actuator comprising the second magnet element 122 and the second coil 124.

While "upper" and "lower" are described with reference to the orientation of the lens control apparatus 100 as illustrated in the figure, in operation, the optical axis is aligned with the direction that the lens control apparatus 100 is being aimed at, such as to take a photograph. For example, if the optical axis is generally horizontal to the ground, a first lateral axis could be horizontal to the ground and generally perpendicular to the optical axis. A second lateral axis would be generally perpendicular to the optical axis and in a plane with first lateral axis.

Figure 6:
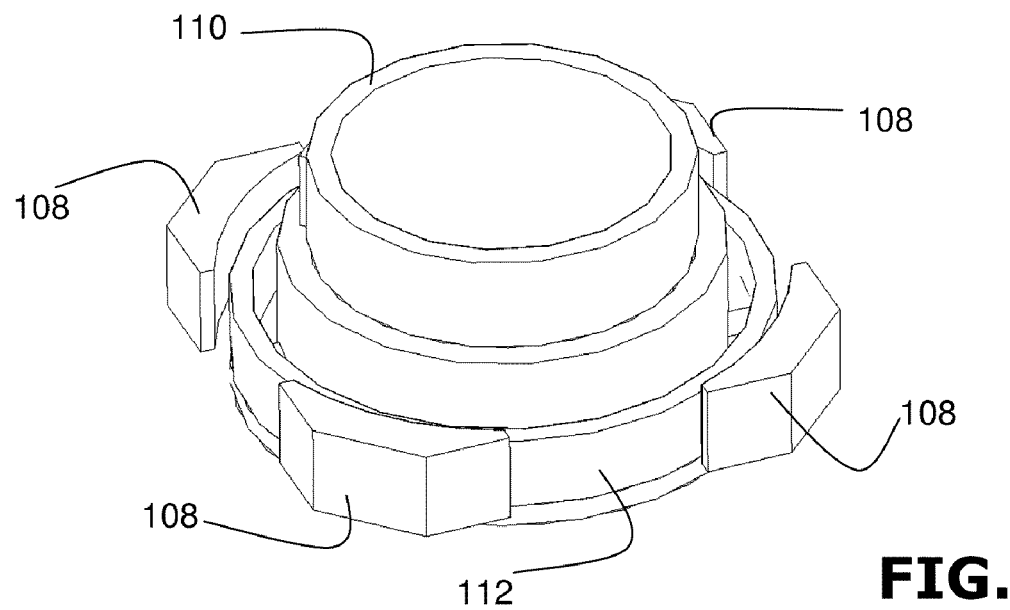
FIG. 6 is a partial perspective view of a lens holder and an autofocus actuator, in accordance with an embodiment of the present invention.

FIG. 6 is a perspective view of a lens holder and an autofocus actuator, in accordance with an embodiment of the present invention. The autofocus actuator comprises the coil 112 and the autofocus actuator magnet elements 108. In the illustrated embodiment, four magnet elements 108 are shown, one located in each corner of the casing of the lens control apparatus 100 (FIG. 1). When electric current is provided to the coil 112, a resulting motion of the coil 112 occurs. The coil 112 is fixedly coupled to the lens holder 110 such that motion of the coil 112 consequently results in motion of the lens holder 110. The autofocus actuator magnet elements 108 are positioned substantially adjacent to the coil 112 such that the magnetic field induced by the electric current flowing through each of the coils 112 interacts with the magnetic field of each of the autofocus actuator magnet elements 108, which assists creating the motion of the coil 112. According to one embodiment, the autofocus actuator magnet elements 108 are positioned substantially perpendicular to the face of the coil 112 to provide increased translation motion of the lens holder 110 relative to the autofocus actuator magnet elements 108. The autofocus actuator magnet elements 108 are generally fixed within the casing, such as by the supports 116 (FIG. 3) and the lower casing 104 (FIG. 3), such that movement of the coil 112 and the lens holder 110 is produced, as opposed to motion of the magnet elements 108.

The interaction between the magnetic field of the magnet element 108 and the magnetic field induced by the electric current flowing through the coil 112 exerts a force in a direction generally parallel to the optical axis and the imaging lens unit 106 is displaced vertically along the optical axis as a result. The vertical movement of the coil 112 is translated to a vertical movement of at least part of the lens holder 110 to which the coil 112 is coupled. The bottom part of the magnet element 108 faces the coil 112 and the top part of the magnet element 108 faces the portion of the lens holder 110 designed to receive the force exerted by the coil 112.

The autofocus actuator 119 can be controlled separately from the first and second lateral actuators 121, 125. Therefore, this separation allows for precise control over each of the functions, both the autofocus function and the motion control function either separately or in conjunction as desired. In another embodiment, control of the autofocus function and control of the motion control function can be provided separately, depending on the requirements of the particular application.

Figure 7:
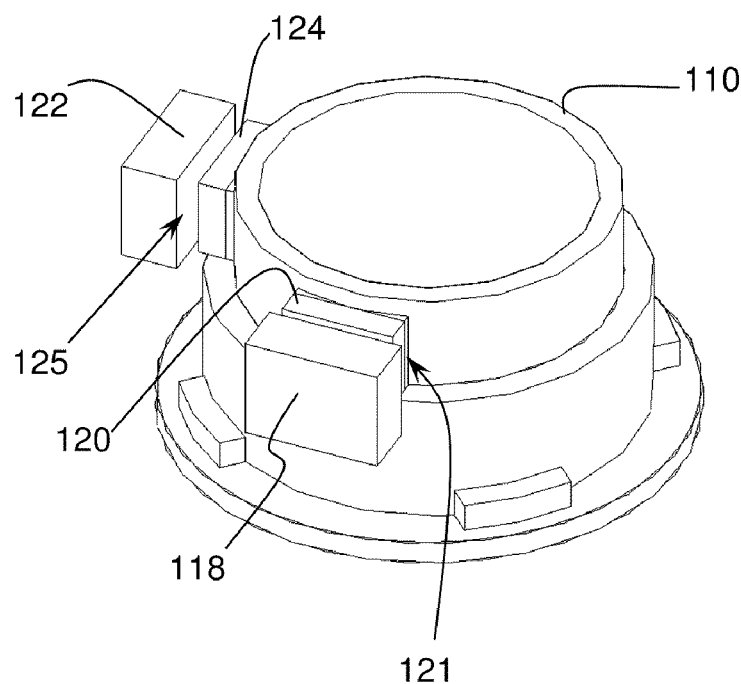
FIG. 7 is a partial perspective view of a lens holder and a motion control actuator, in accordance with an embodiment of the present invention.

FIG. 7 is a perspective view of a lens holder and a motion control actuator, in accordance with an embodiment of the present invention. Referring to the first and second lateral actuators, each of the first and second magnet elements 118, 122 are disposed relative to each of the first and second coil 120, 124, respectively, such that each of the first and second magnet elements 118, 122 are oriented generally to adjacent the lens holder 110 and substantially normal to the surface of the lens holder 110. When provided with an electric current, the first and second coils 120, 124 are displaced from the first and second magnet elements 118, 122, respectively, thereby causing lateral motion. Because each of the first coil 120 and the second coil 124 are fixedly coupled to the lens holder 110, or according to another embodiment, positioned proximate to the lens holder 110, engagement of the first and second lateral actuators 121, 125 produces motion of the lens holder 110 in two directions. The lateral motion created by the first and second lateral actuators 121, 125 results in a tilting of the lens holder 110, and contemporaneous tilting of the imaging lens unit 106 contained in the lens holder 110, which can counteract the motion of a device containing the lens control apparatus 100.

The autofocus actuator 119 and the first and second lateral actuators 121, 125 may be any suitable type of actuator. In another embodiment, one or more of the actuators is a voice coil motor (VCM) actuator. In another embodiment, one or more of the actuators is a piezoelectric actuator. One or more of the actuators may also be an electro-active polymer device, or any other suitable type of actuator able to generate the required motion.

The lateral actuators 121, 125 may be independently controlled or may be electrically connected in series, depending on the kind of control that is required. According to one embodiment, for motion control, the first coil 120 and the second coil 124 can be connected such that the electric current flowing through the first coil 120 and the second coil 124 provides for each of the first and second coil 120, 124 to be controlled independently.

The coils are made of an electrically conductive material. Components of the lens control apparatus other then the coils and the magnetic elements, such as the casing and the lens holder 110, may be made of non-magnetic materials such as plastics or non-magnetic metal alloys, so as not to interfere with the magnetic fields of the coils and the magnetic elements.

While the imaging lens unit 106 and the lens holder 110 are illustrated as two separate components in the accompanying figures, according to another embodiment, the imaging lens unit 106 and the lens holder 110 may be integrally formed as a single component. Accordingly, according to another embodiment, each of the autofocus actuator 119, the first lateral actuator 121, and the second lateral actuator 125 may act directly upon the imaging lens unit 106. The imaging lens unit 106 and the lens holder 110 may generally be referred to as a lens element. Therefore, according to one embodiment of the present invention, the lens element includes both the imaging lens unit 106 and the lens holder 110. According to another embodiment, the lens element includes the imaging lens unit 106, where the various components cooperate with the imaging lens unit 106, similar to the above description referring to the lens holder 110. According to one embodiment, the imaging lens unit includes one or more optical lenses use to an image. Any suitable imaging lens unit 106 may be used, and the imaging lens unit may also include other components needed to accomplish this purpose.

Figure 8:
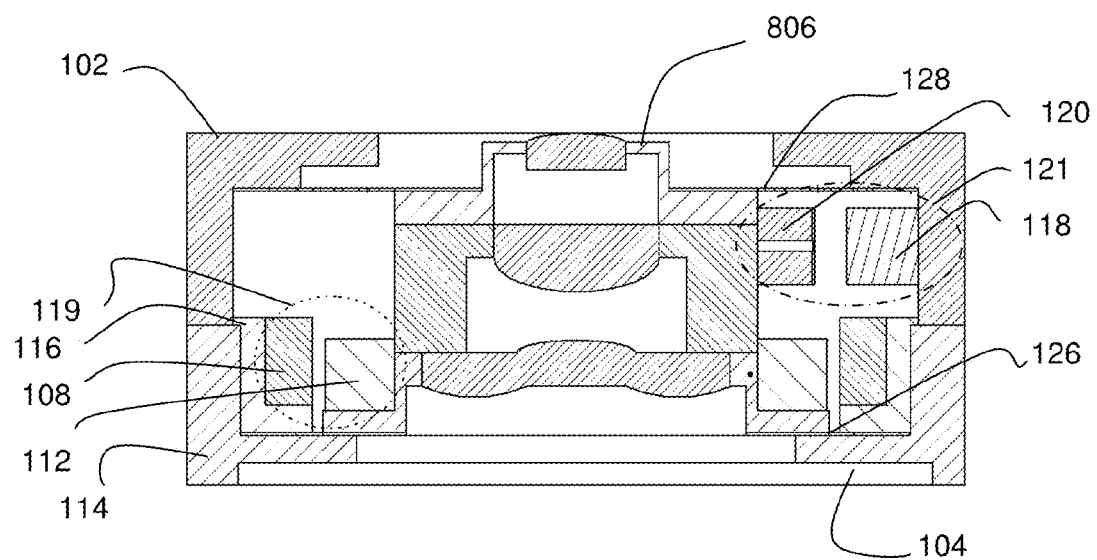
FIG. 8 is a side cross sectional view of a lens control apparatus, in accordance with a second embodiment of the present invention.

FIG. 8 is a side cross sectional view of a lens control apparatus, in accordance with a second embodiment of the present invention. FIG. 8 shows another embodiment of the internal configuration of the lens control apparatus. The external configuration is generally similar to that shown in FIGS. 1 to 3. The cross sectional view shown in FIG. 8 is therefore also taken at line A, shown in FIG. 3.

The upper casing 102, the lower casing 104, the imaging lens unit 806, and the autofocus actuator magnet elements 108 are shown. In the embodiment illustrated in FIG. 8, the imaging lens unit 806 is shown without any lens holder. A coil 112 is attached to the imaging lens unit 806, wherein motion to the coil 112 produces corresponding motion in the imaging lens unit 806. A plurality of corners posts 114, one in each corner of the lower casing 104, each engages a corresponding support 116. The coil 112 together with the autofocus actuator magnet elements 108 comprises an autofocus actuator 119. A set of actuator magnet elements is positioned to interact with a first coil 120 and a second coil (not shown). A first magnet element 118 of the actuator magnet elements is positioned proximate to a first coil 120. The first magnet element 118 and the first coil 120 together comprise a first actuator 121. A second magnet element of the set of actuator magnet elements and the second coil together comprise a second actuator. A motion control mechanism is thereby provided to control a pivoting motion of the lens 806 in two dimensions. The embodiment of the lens control apparatus illustrated in FIG. 8 operates similarly to the embodiment described with reference to FIG. 4.

A lower spring 126 is positioned in the lower casing 104 and an upper spring 128 is positioned in the upper casing 102. The lower spring 126 is disposed between the lower casing 104 and the imaging lens unit 806 and the upper spring 128 is disposed between the upper casing 102 and the imaging lens unit 806. The lower spring 126 and the upper spring 128 assist with controlling the movement of the imaging lens unit 806 within the casing. For example, each of the lower spring 126 and the upper spring 128 may be a coil spring, having a diameter larger than the diameter of the imaging lens unit 806. The lower spring 126 and the upper spring 128 may also each be a leaf spring or one or more leaf springs arranged proximate to the respective ends of the imaging lens unit lens 806.

Embodiments of the present invention may include a combination of an autofocus actuator and the motion control actuator is that in our present invention, both the autofocus actuator and the anti-shaking actuator apply force on the lens holder to produce motion along the optical axis and tilting motion about the optical axis. Accordingly, the lens holder moves independently from both the autofocus actuator and motion control actuator, one of the actuator moves the lens holder and the other actuator. As described before, in operation, a pivot point may be formed between the upper spring and the lower spring. However, depending on the particular configuration, the pivot point may be formed in other locations in the lens control apparatus. In one embodiment, each of the upper and lower springs is symmetric about one or more bisecting axes. The symmetry of the springs may affect the position of the pivot point which may affect the tilting motion of the lens holder 110. For example, the symmetry of the springs assist in keeping the pivot point generally along the optical axis and minimizing or limiting translation motion of the lens holder 110.

Figure 9A:
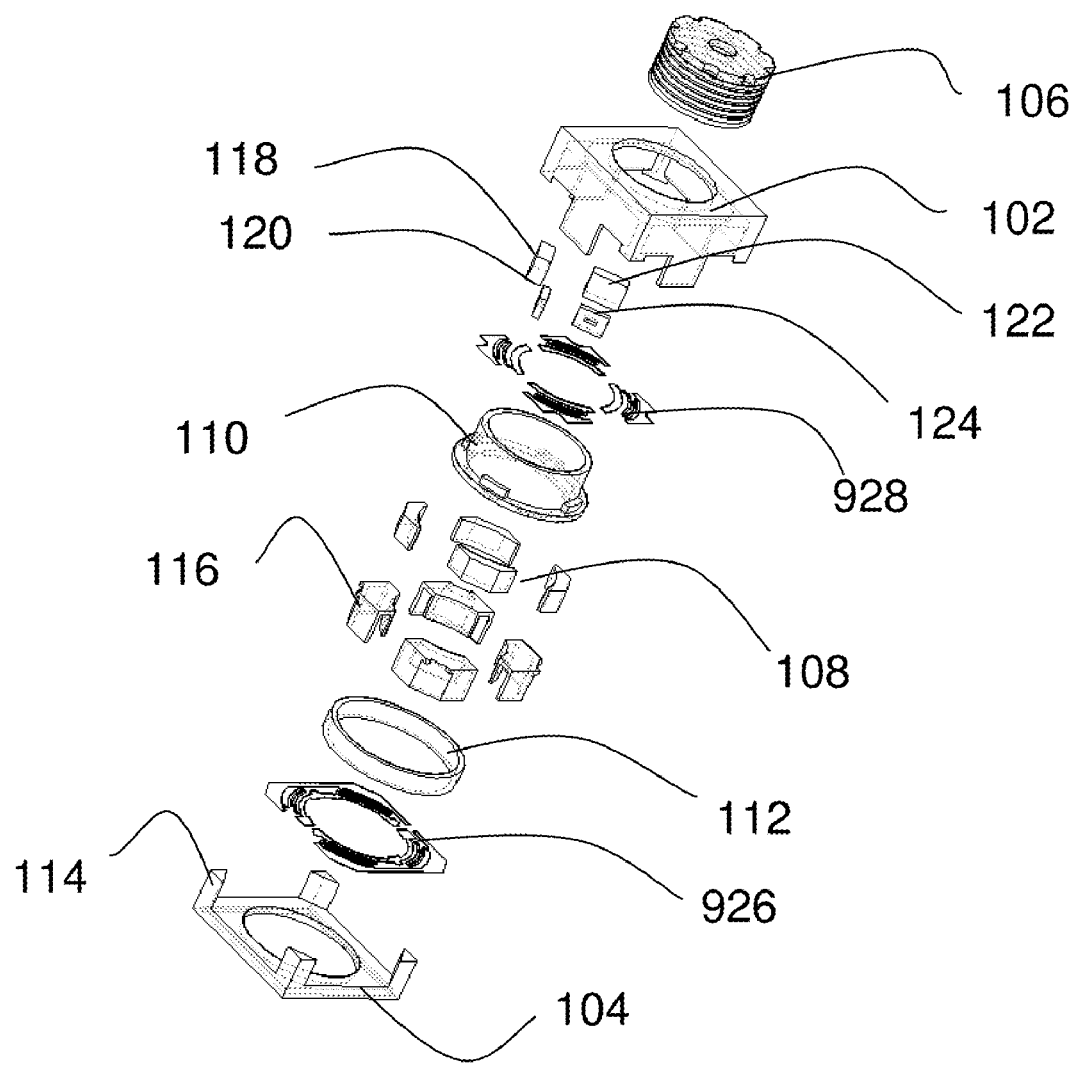
FIG. 9A is an exploded view of the lens control apparatus shown in FIG. 8, in accordance with an embodiment of the present invention.
Figure 9B:
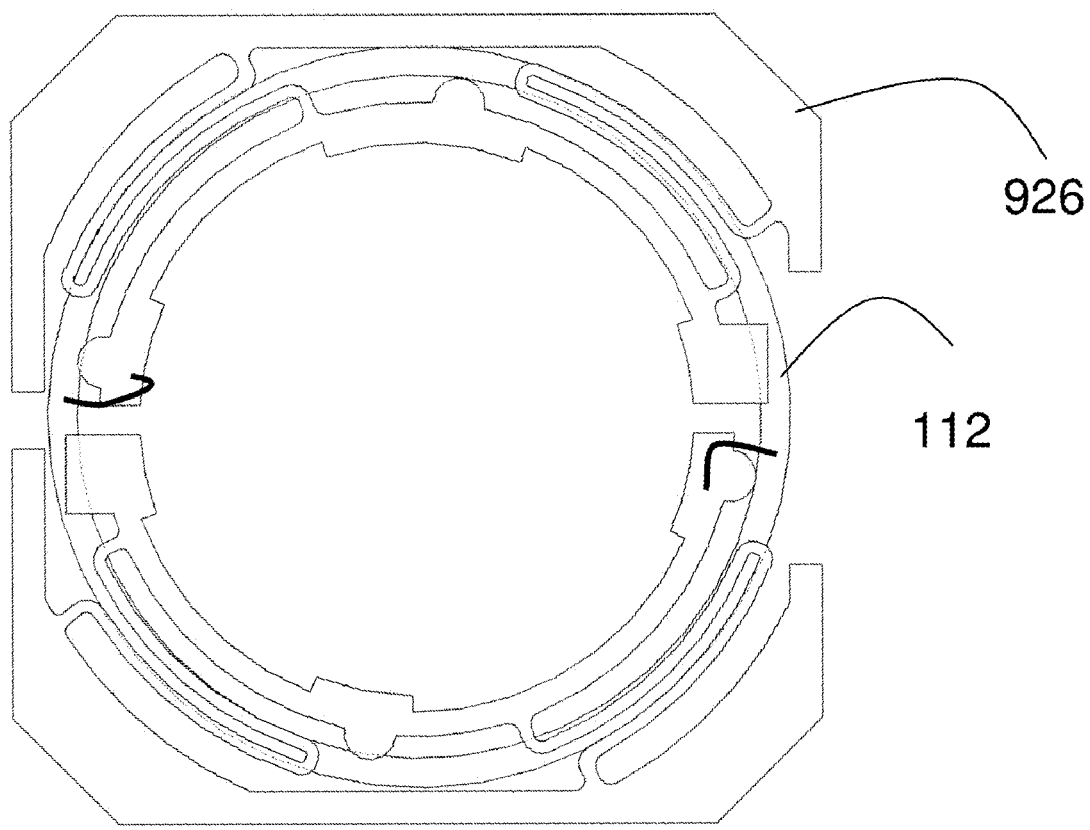
FIG. 9B is a partial top view showing the electrical connection between a coil of the autofocus actuator and a lower spring in the lens control apparatus shown in FIG. 8, in accordance with an embodiment of the present invention.
Figure 9C:
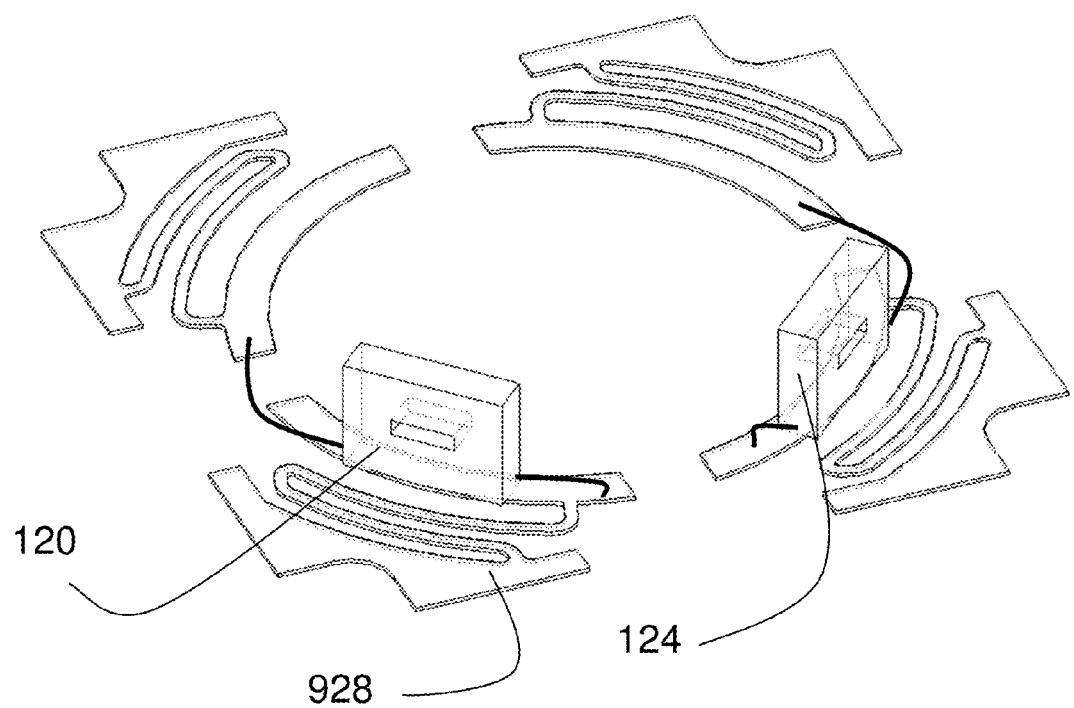
FIG. 9C is a partial perspective view showing the electrical connection between the two motion control actuators and an upper spring of the lens control apparatus shown in FIG. 8, in accordance with an embodiment of the present invention.

Referring to FIGS. 9A, 9B and 9C, an embodiment of the present invention is shown where the lower spring 926 and upper spring 928 are used as the electrodes. The lower spring 926 and upper spring 928 electrically connected to the coils of the autofocus actuator and the two lateral actuators. Referring to FIG. 9B, the coil 912 of the autofocus actuator is electrically connected with the lower spring 926. Referring to FIG. 9C, the two anti-shaking actuators coils 920, 924 are electrical connected with the upper spring 928. Accordingly, each of the upper spring 928 and the lower spring 926 may function as electrodes. Also, in the embodiment illustrated in FIG. 9C, it can be seen that the upper spring 928 is comprised of four separate leaf springs. However, any number of springs may be used.

A controller, an electric circuit and a power source may be provided to control the actuators such that each of the actuators may be controlled, either independently or collectively with control provided simultaneous to provide both autofocus and motion control simultaneously according to the required performance.

Embodiments of the present invention are well suited for use in small devices, such as mobile telephones and small camera devices. When used in a device, the lens control apparatus may operate in conjunction with an image capturing mechanism, which is configured to capture an image transmitted by the imaging lens unit 106, the controller configured to drive the autofocus actuator 119 and the first and second lateral actuators 121, 125, memory to store controller instructions, a power source, such as a battery, to power the various components, and communications means, such as electrical lines or circuit connections, to facilitate communication between the various components of the lens control apparatus 100.

The configuration of the actuators being located around the lens holder 110 has the advantage that the actuators can be compactly disposed inside a casing. The inside of the casing and the lens holder 110 may be complementary in size, shape, materials, and configuration so as to allow smooth and accurate movement of the lens holder 110 within the casing.

One feature of embodiments of the present invention is that the autofocus actuator 119 and the first and second lateral actuators 121, 125 are positioned proximate to the lens holder 110. In one embodiment, the autofocus actuator 119 and the first and second lateral actuators 121, 125 are adjacent to the lens holder 110 and each of the autofocus actuator 119, the first lateral actuator 121, and the second lateral actuator 125 acts directly upon the lens holder 110. The close positioning and the direct engagement of the actuators with the lens holder 110 provide for a reduced size lens control apparatus 100 providing both autofocus and motion control functions. A lens control apparatus with a reduced size is especially desirable for small digital cameras or mobile telephones with camera modules.

Figure 10:
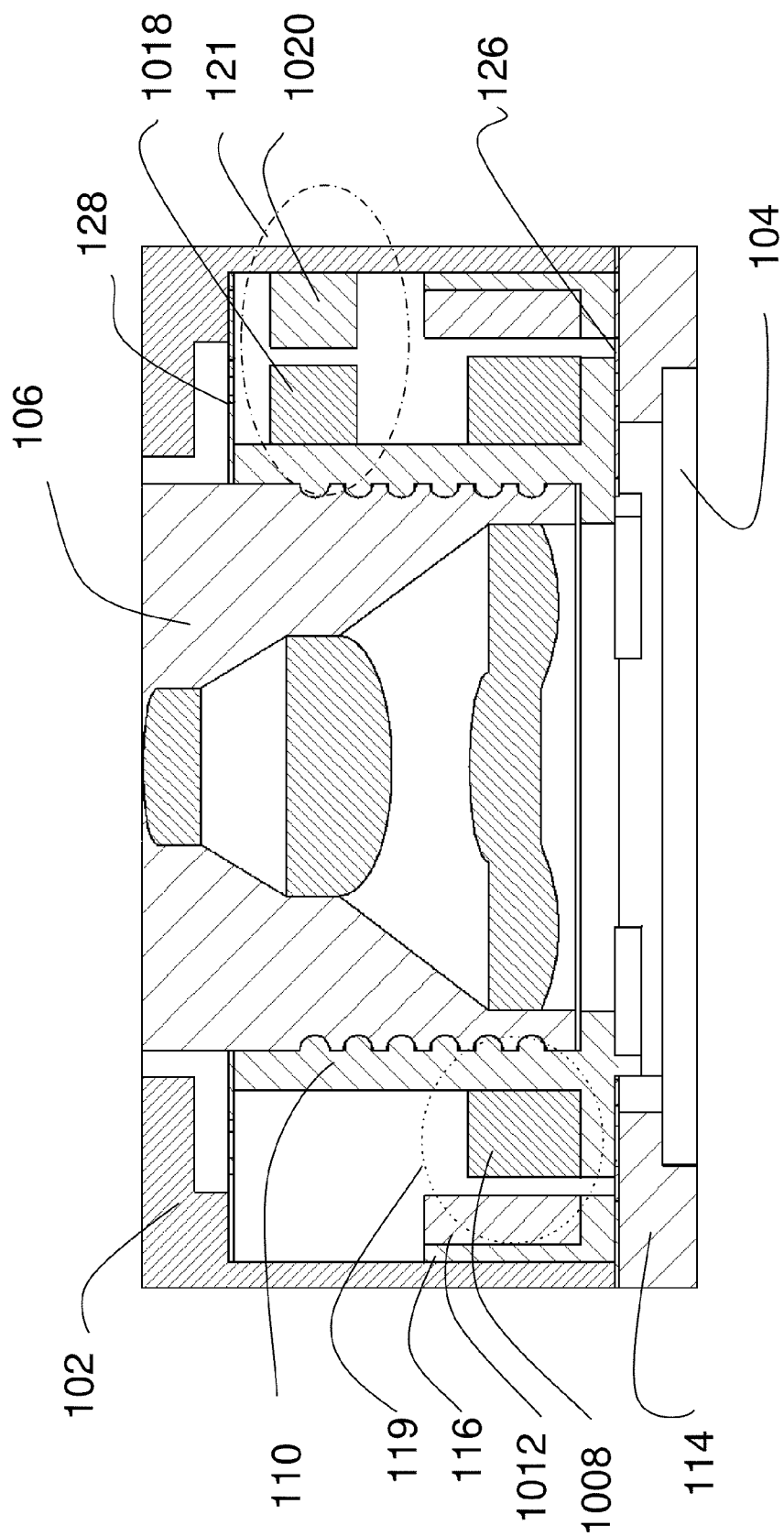
FIG. 10 is a side cross sectional view of a lens control apparatus, in accordance with an embodiment of the present invention.
Figure 11:
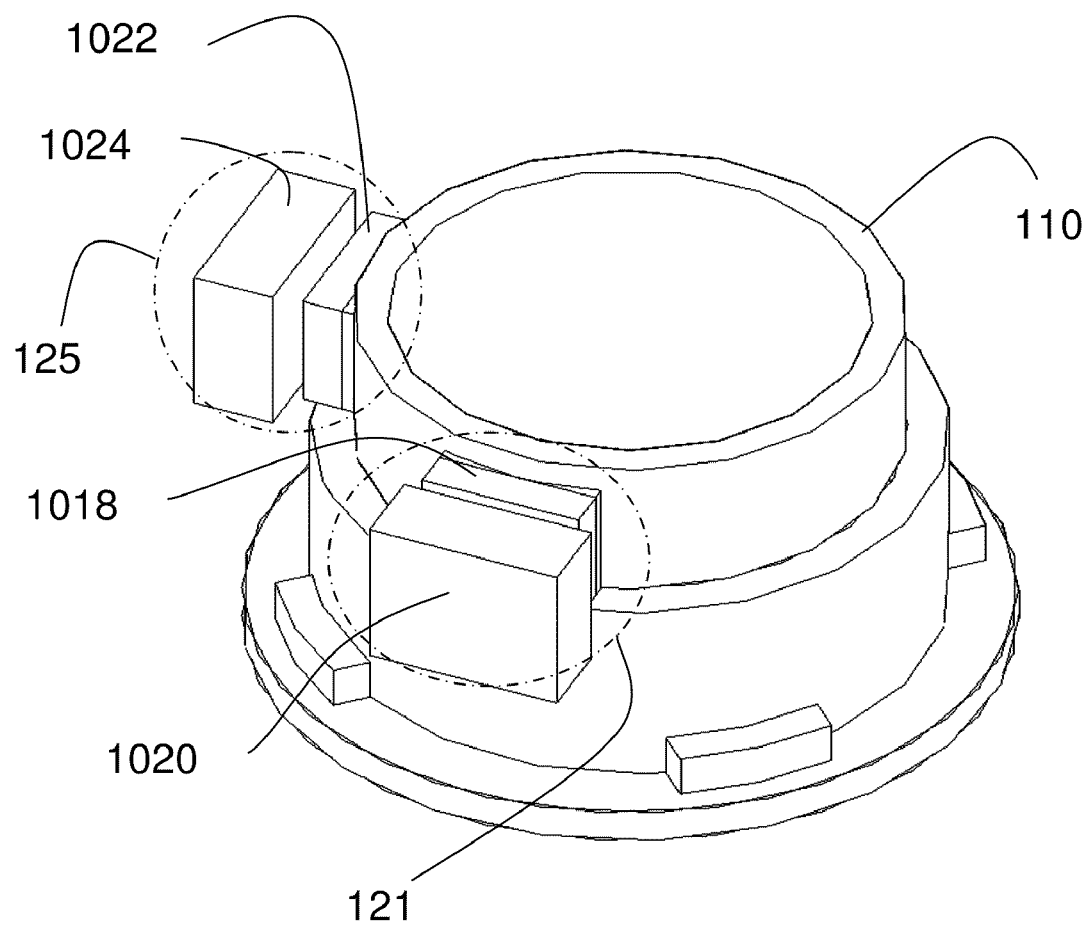
FIG. 11 is a partial perspective view of the lens holder and the motion control actuator shown in FIG. 10, in accordance with an embodiment of the present invention.

Referring now to FIGS. 10 and 11, an embodiment of the present invention is shown having the coils and the magnet elements in a different configuration. In the embodiment shown in FIG. 10, the magnet elements 1008 are fixedly coupled to the lens holder 110 such that motion of the coil 1008 consequently results in motion of the lens holder 110. According to one embodiment, the coil 1012 is positioned substantially perpendicular to the face of the magnet element 1008 to provide increased translation motion of the lens holder 110 relative to the coil 1012. The coil 1012 is generally fixed within the casing, such as by the supports 116. The magnet element 1008 and the coil 1012 comprise the autofocus actuator 119, a first magnet element 1018 and a first coil 1020 comprise the first lateral actuator 121, and a second magnet 1022 and a second coil 1024 comprise the second lateral actuator 125.

FIG. 11 is a partial perspective view of the lens holder and the motion control actuator shown in FIG. 10, in accordance with an embodiment of the present invention. Referring to the first and second lateral actuators 121, 125, each of the first and second magnet elements 1018, 1022 are disposed relative to each of the first and second coils 1020, 1024, respectively, such that each of the first and second coils 1020, 1024 are oriented generally to adjacent the lens holder 110 and substantially normal to the surface of the lens holder 110. When provided with an electric current, the magnet elements 1018, 1022 are displaced from the coils 1020, 1024, thereby causing lateral motion. Because each of the magnet elements 1018, 1022 are fixedly coupled to the lens holder 110, or according to another embodiment, positioned proximate to the lens holder 110, engagement of the first and second lateral actuators 121, 125 produces lateral motion of the lens holder 110 in two directions. The lateral motion results in a tilting of the lens holder 110.

While the invention has been particularly shown and described with reference to the illustrated embodiments, those skilled in the art will understand that changes in form and detail may be made without departing from the spirit and scope of the invention. For example, the lens holder 110 may have different configurations without departing from the scope and spirit of the invention, and the casing may take other shapes and configurations from that shown in the illustrated embodiment. The number, placement, type and configuration of one or more of the actuators may also be different from that shown in the illustrated embodiments. Therefore, while two lateral actuators are illustrated, two or more lateral actuators may be used. A single lateral actuator may also be used. Also, while the illustrated embodiment of the autofocus actuator includes four magnet elements 108, an embodiment including a greater or fewer number of magnet elements may also be used.

Accordingly, the above description is intended to provide example embodiments of the present invention, and the scope of the present invention is not to be limited by the specific examples provided.

What is claimed is:

1. A lens control apparatus for providing autofocus and motion control, the lens control apparatus comprising:
    a casing;
    a lens holder holding an imaging lens unit, the lens holder movable within the casing along an optical axis extending longitudinally, the lens holder further pivotable within the casing about the optical axis, the lens holder further movable along the optical axis;
    an autofocus actuator disposed within the casing, wherein the autofocus actuator is configured to move the lens holder within the casing along the optical axis;
    a first lateral actuator disposed within the casing, wherein the first lateral actuator is configured to provide a force to pivot the lens holder in a first lateral direction relative to the optical axis;
    a second lateral actuator disposed within the casing, wherein the second lateral actuator is configured to provide a force to pivot the lens holder in a second lateral direction relative to the optical axis, wherein at least a part of the autofocus actuator is coupled to the lens holder, and at least a part of the first lateral actuator and at least a part of the second lateral actuator are each coupled to the lens holder; and
    an upper spring and a lower spring, each spring disposed between the casing and the lens holder and configured to guide the motion of the lens holder, the upper spring and the lower spring both further disposed along the optical axis either above or below the lateral actuators;
    wherein the autofocus actuator is disposed within the casing at a first longitudinal position along the optical axis and the lateral actuators are disposed within the casing at a second longitudinal position along the optical axis different than the first longitudinal position along the optical axis, wherein the autofocus actuator is further disposed between the upper and lower springs.

2. The lens control apparatus of claim 1, wherein the autofocus actuator is configured to generate a force on the lens holder to generate motion in a direction generally parallel to the optical axis.

3. The lens control apparatus of claim 2, wherein the autofocus actuator is further configured to independently generate the force on the lens holder, the first lateral actuator is further configured to independently provide the force on the lens holder in the first lateral direction, and the second lateral actuator is further configured to independently provide the force on the lens holder in the second lateral direction.

4. The lens control apparatus of claim 1, wherein the imaging lens unit comprises one or more lenses used to form an image of an object.

5. The lens control apparatus of claim 1, further comprising a controller in operable communication with the autofocus actuator, the first lateral actuator, and the second lateral actuator, wherein the autofocus actuator includes a coil and at least one magnetic element, the coil configured to receive current in response to control signals sent by the controller.

6. The lens control apparatus of claim 1, wherein the first lateral actuator includes at least one coil and at least one magnetic element, and the second lateral actuator includes at least one coil and at least one magnetic element.

7. The lens control apparatus of claim 6, wherein the coil of the autofocus actuator is electrically coupled with the lower spring.

8. The lens control apparatus of claim 6, wherein the at least one coil of the first lateral actuator and the at least one coil of the second lateral actuator are both electrically coupled with the upper spring.

9. The lens control apparatus of claim 1, wherein each of the first lateral actuator and the second lateral actuator is a voice coil motor (VCM).

10. The lens control apparatus of claim 1, further comprising a controller and a power source, wherein the controller is configured to deliver current from the power source to each of the autofocus actuator, the first lateral actuator, and the second lateral actuator.

11. A lens control apparatus for providing autofocus and motion control in response to control signals sent to the lens control apparatus by a controller, the lens control apparatus comprising:
    a casing;
    a lens holder movable within the casing along an optical axis extending longitudinally, the lens holder further pivotable within the casing about the optical axis;
    an autofocus control mechanism, wherein the autofocus control mechanism is configured to receive focus signals from the controller, the autofocus mechanism further configured to move the lens holder relative to the casing along the optical axis in response to the received focus signals; and
    a motion control mechanism, wherein the motion control mechanism is configured to receive motion control signals from the controller, the motion control mechanism further configured to pivot the lens holder relative to the optical axis in response to the motion control signals;
    wherein the autofocus control mechanism is disposed at a first longitudinal position along the optical axis and the motion control mechanism is disposed at a second longitudinal position along the optical axis different than the first longitudinal position along the optical axis.

12. The lens control apparatus of claim 11, wherein the autofocus control mechanism includes at least one autofocus actuator configured to apply translational force to the lens holder, thereby translating the lens holder along the optical axis.

13. The lens control apparatus of claim 12, wherein the motion control mechanism includes two or more actuators, wherein a first actuator of the two or more actuators is configured to apply a force to the lens holder in the direction of the first lateral axis, and a second actuator of the two or more actuators is configured to apply a force to the lens holder in the direction of the second lateral axis.

14. The lens control apparatus of claim 13, wherein the autofocus actuator is further configured to apply the translational force directly on the lens holder, the first actuator of the two or more actuators is further configured to apply the force directly on the lens holder, and the second actuator of the two or more actuators is further configured to apply the force directly on the lens holder.

15. The lens control apparatus of claim 11, further comprising an upper spring and a lower spring, each of the upper spring and the lower spring disposed between the lens holder and the casing and configured to guide the motion of the lens holder.

16. The lens control apparatus of claim 15, wherein the upper spring is further disposed above the motion control mechanism and the lower spring is further disposed below the lateral actuators, wherein the autofocus control mechanism is further disposed between the springs.

17. A lens control apparatus for providing autofocus and motion control, the lens control apparatus comprising:
  a casing;
  an imaging lens unit movable within the casing along an optical axis extending longitudinally, the imaging lens unit further pivotable within the casing about the optical axis;
  an autofocus actuator disposed within the casing, wherein the autofocus actuator is configured to move the imaging lens unit within the casing along the optical axis;
  a first lateral actuator disposed within the casing, wherein the first lateral actuator is configured provide a force to make the imaging lens unit pivot in a first lateral direction relative to the optical axis; and
  a second lateral actuator disposed within the casing, wherein the second lateral actuator is configured to provide a force to make the imaging lens unit pivot in a second lateral direction relative to the optical axis, and wherein at least a part of the autofocus actuator is coupled to the imaging lens unit, and at least a part of the first and second lateral actuators are coupled to the imaging lens unit;
  wherein the autofocus actuator is disposed within the casing at a first longitudinal position along the optical axis and the lateral actuators are disposed within the casing at a second longitudinal position along the optical axis different than the first longitudinal position along the optical axis.

18. The lens control apparatus of claim 17, wherein the imaging lens unit comprises one or more lenses used to form an image of an object.

* * * * *